US011124718B2

(12) United States Patent
Gadgil et al.

(10) Patent No.: US 11,124,718 B2
(45) Date of Patent: Sep. 21, 2021

(54) SORBENT UTILIZATION IMPROVEMENT BY SELECTIVE ASH RECIRCULATION FROM A PARTICULATE COLLECTOR

(71) Applicant: The Babcock & Wilcox Company, Barberton, OH (US)

(72) Inventors: Mandar R Gadgil, Akron, OH (US); Laura M McDermitt, Wadsworth, OH (US); John R Cline, Akron, OH (US); Tony F Habib, Lancaster, OH (US); Prasanna Seshadri, Akron, OH (US)

(73) Assignee: The Babcock & Wilcox Company, Akron, OH (US)

( * ) Notice: Subject to any disclaimer, the term of this patent is extended or adjusted under 35 U.S.C. 154(b) by 297 days.

(21) Appl. No.: 15/907,912

(22) Filed: Feb. 28, 2018

(65) Prior Publication Data

US 2019/0264117 A1 Aug. 29, 2019

(51) Int. Cl.

| | |
|---|---|
| ***B01D 53/02*** | (2006.01) |
| ***C10J 3/26*** | (2006.01) |
| ***F22G 1/02*** | (2006.01) |
| ***B03C 3/155*** | (2006.01) |
| ***B03C 3/12*** | (2006.01) |

(Continued)

(52) U.S. Cl.

CPC ................. *C10J 3/26* (2013.01); *B03C 3/013* (2013.01); *B03C 3/12* (2013.01); *B03C 3/155* (2013.01); *C10J 3/00* (2013.01); *C10J 3/84* (2013.01); *C10K 1/028* (2013.01); *F22B 33/18* (2013.01); *F22G 1/02* (2013.01); *F22G 1/14* (2013.01); *C10J 2200/09* (2013.01); *F22G 1/16* (2013.01)

(58) Field of Classification Search

CPC ......... B03C 3/013; B03C 3/017; B03C 3/025; B03C 3/12; B03C 3/155; C10J 2200/09; C10J 3/00; C10J 3/26; C10J 3/84; F22G 1/02; F22G 1/14; F22G 1/16; F23J 15/00; F23J 3/00

See application file for complete search history.

(56) References Cited

U.S. PATENT DOCUMENTS 4,523,931 A * 6/1985 Miller .................... B01D 46/02 55/309.1
5,795,548 A * 8/1998 Madden ............... B01D 53/505 110/216

(Continued)

*Primary Examiner* — Christopher P Jones
(74) *Attorney, Agent, or Firm* — Michael J. Seymour

(57) ABSTRACT

Various embodiments of a system for the removal of particulate emissions from an electric generating unit are provided, comprising: a gas producer; a primary particulate collector unit including: a primary collection hopper field each including at least one primary collection hopper, wherein each primary collection hopper includes a primary collection hopper outlet, each primary collection hopper outlet fluidically connected to a particulate discharge duct; a flue duct inlet oriented upstream of the at least one primary collection hopper field; a flue duct outlet oriented downstream of the primary collection hopper field; wherein the gas producer is fluidically connected to the primary particulate collector unit by a flue duct; and a particulate recirculation duct fluidically connected at a first end to the primary collection hopper and/or the particulate discharge duct, and fluidically connected at a second end to the flue duct upstream of the primary particulate collector unit.

15 Claims, 9 Drawing Sheets

(51) Int. Cl.

| | |
|---|---|
| ***F22B 33/18*** | (2006.01) |
| ***F22G 1/14*** | (2006.01) |
| ***C10J 3/84*** | (2006.01) |
| ***C10K 1/02*** | (2006.01) |
| ***C10J 3/00*** | (2006.01) |
| ***B03C 3/013*** | (2006.01) |
| *F22G 1/16* | (2006.01) |

(56) References Cited

U.S. PATENT DOCUMENTS

2003/0206843 A1* 11/2003 Nelson, Jr. ............ B01D 53/02 423/210
2004/0076557 A1* 4/2004 Altman ................. B01D 46/50 422/171
2005/0132880 A1* 6/2005 Chang .................... B03C 3/013 95/63
2007/0116619 A1* 5/2007 Taylor ................... B01D 53/64 423/210
2008/0175775 A1* 7/2008 Fleischanderl ...... B01D 53/685 423/210
2013/0156665 A1* 6/2013 Jankura ............... B01D 53/505 423/210
2014/0245883 A1* 9/2014 Wieslander .............. B03C 3/08 95/12
2014/0338531 A1* 11/2014 Gayheart .............. B01D 53/83 95/108

* cited by examiner

SORBENT UTILIZATION IMPROVEMENT BY SELECTIVE ASH RECIRCULATION FROM A PARTICULATE COLLECTOR

BACKGROUND

Electric generating units ("EGUs"), including units generating steam through the combustion of fossil fuels, operate under strict standards to mitigate and/or eliminate pollutants. For instance, the Mercury and Air Toxic Standards regulations implemented by the United States Environmental Protection Agency ("US EPA") has created a need to control mercury (Hg) emissions in EGUs.

One method of controlling the emission of undesirable gas phase pollutants from EGUs is through the injection of sorbents into the flue gas generated in the burning of materials for steam generation. The injected sorbents may, in some instances, react with or adsorb targeted gas phase pollutants, which may facilitate the capture of the targeted pollutants in a collector, such as a dry electrostatic precipitator ("ESP") or a fabric filter baghouse.

However, sorbents pose a considerable expense in the operation of EGUs. Thus, a need exists to reduce the quantity of sorbents used in EGU operation, and thus reducing expense, while meeting the strict regulations pertaining to pollutant control.

SUMMARY

In one embodiment, a system for the removal of particulate emissions from an electric generating unit is provided, the system comprising: a gas producer; a primary particulate collector unit including: at least one primary collection hopper field, each primary collection hopper field including at least one primary collection hopper, wherein each primary collection hopper includes a primary collection hopper outlet, and wherein each primary collection hopper outlet is fluidically connected to a particulate discharge duct; a flue duct inlet oriented upstream of the at least one primary collection hopper field; a flue duct outlet oriented downstream of the at least one primary collection hopper field; wherein the gas producer is fluidically connected to the primary particulate collector unit by a flue duct; and a particulate recirculation duct fluidically connected at a first end to at least one of the at least one primary collection hopper and the particulate discharge duct, and fluidically connected at a second end to the flue duct upstream of the primary particulate collector unit.

In another embodiment, a system for the removal of particulate emissions from an electric generating unit is provided, the system comprising: a gas producer; a primary particulate collector, the primary particulate collector comprising a dry electrostatic precipitator, wherein the dry electrostatic precipitator includes a flue duct inlet and a flue duct outlet; a flue duct fluidically connecting the gas producer and the dry electrostatic precipitator at the dry electrostatic precipitator flue duct inlet; a particulate recirculation duct fluidically connected at a first end to the flue duct downstream of the dry electrostatic precipitator, the particulate recirculation duct connected to a secondary particulate collector unit, wherein the secondary particulate collector unit includes: a particulate recirculation duct inlet fluidically connected to the particulate recirculation duct; a fluid duct outlet fluidically connected to the flue duct by a fluid duct; and at least one secondary collection hopper, wherein the at least one secondary collection hopper includes a secondary collection hopper outlet, wherein the secondary collection hopper outlet is fluidically connected to the particulate recirculation duct downstream of the at least one secondary collection hopper, and wherein the particulate recirculation duct inlet is fluidically connected to the particulate recirculation duct upstream of the at least one secondary collection hopper; and wherein the particulate recirculation duct is connected at a second end to the flue duct downstream of the dry electrostatic precipitator, and upstream of its first end, so that a flow of a fluid through the particulate recirculation duct is opposite the flow of a fluid through the flue duct.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1A:
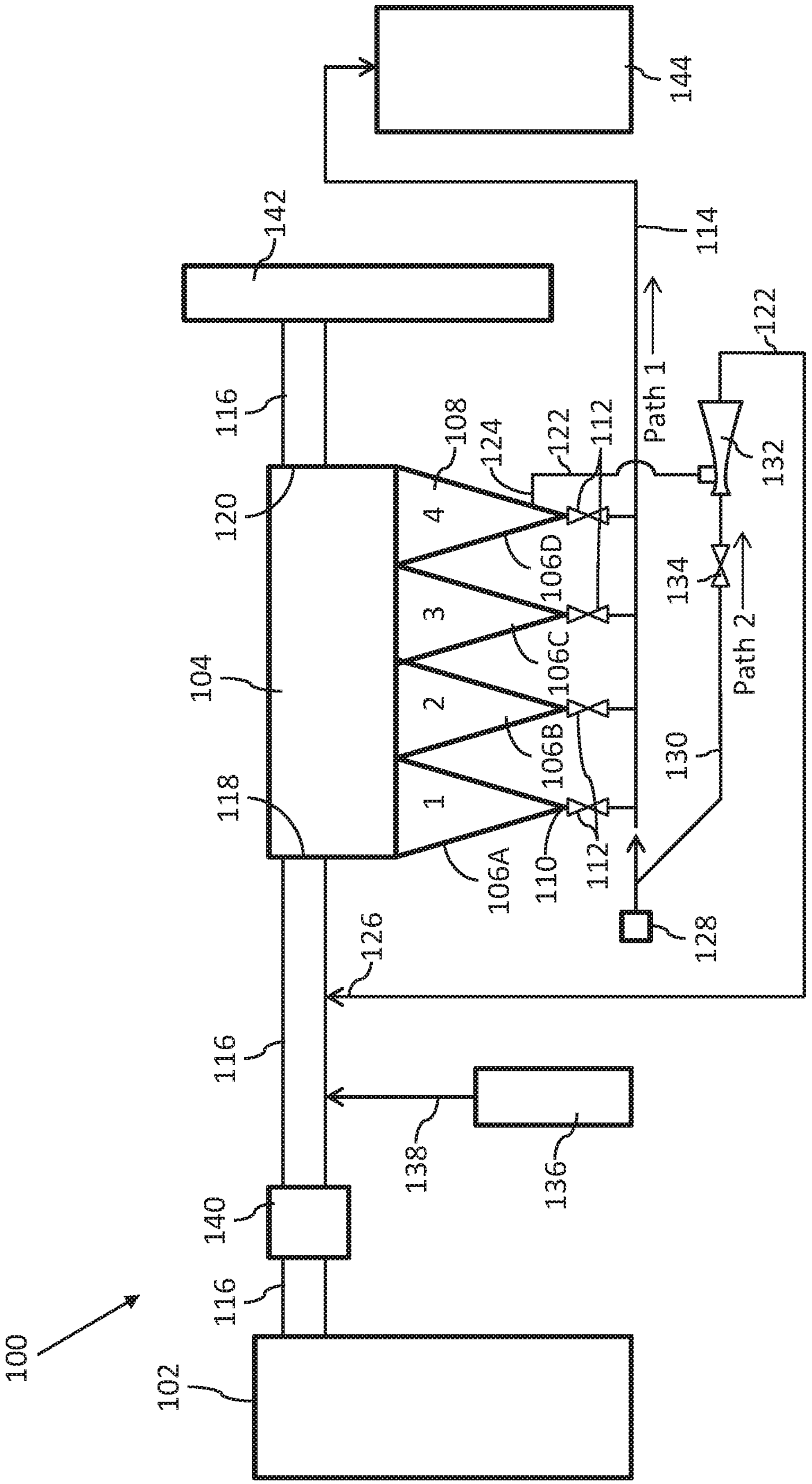
FIG. 1A illustrates a schematic of a system 100 for the removal of particulate emissions from an EGU.
Figure 1B:
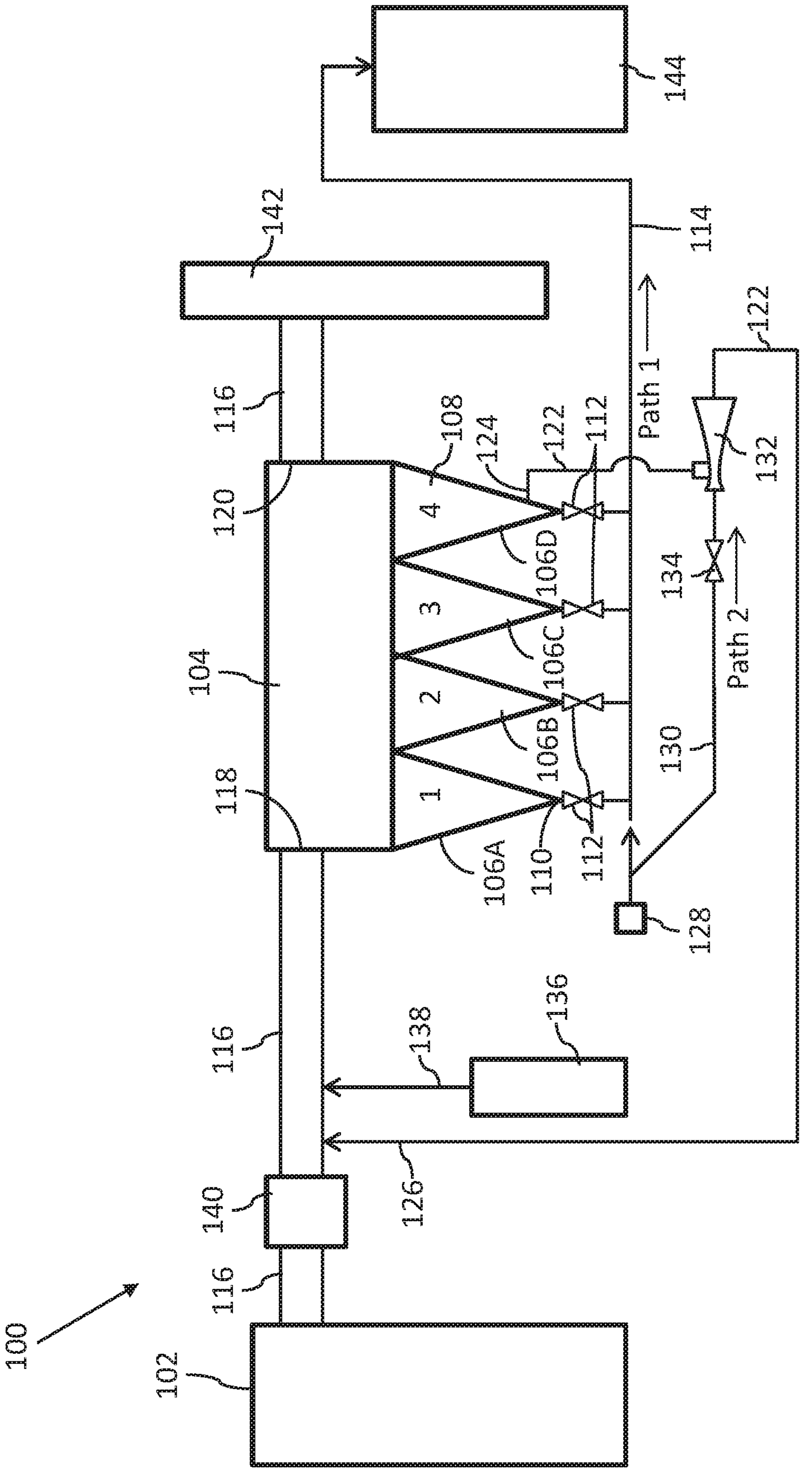
FIG. 1B illustrates a schematic of system 100 for the removal of particulate emissions from an EGU.
Figure 1C:
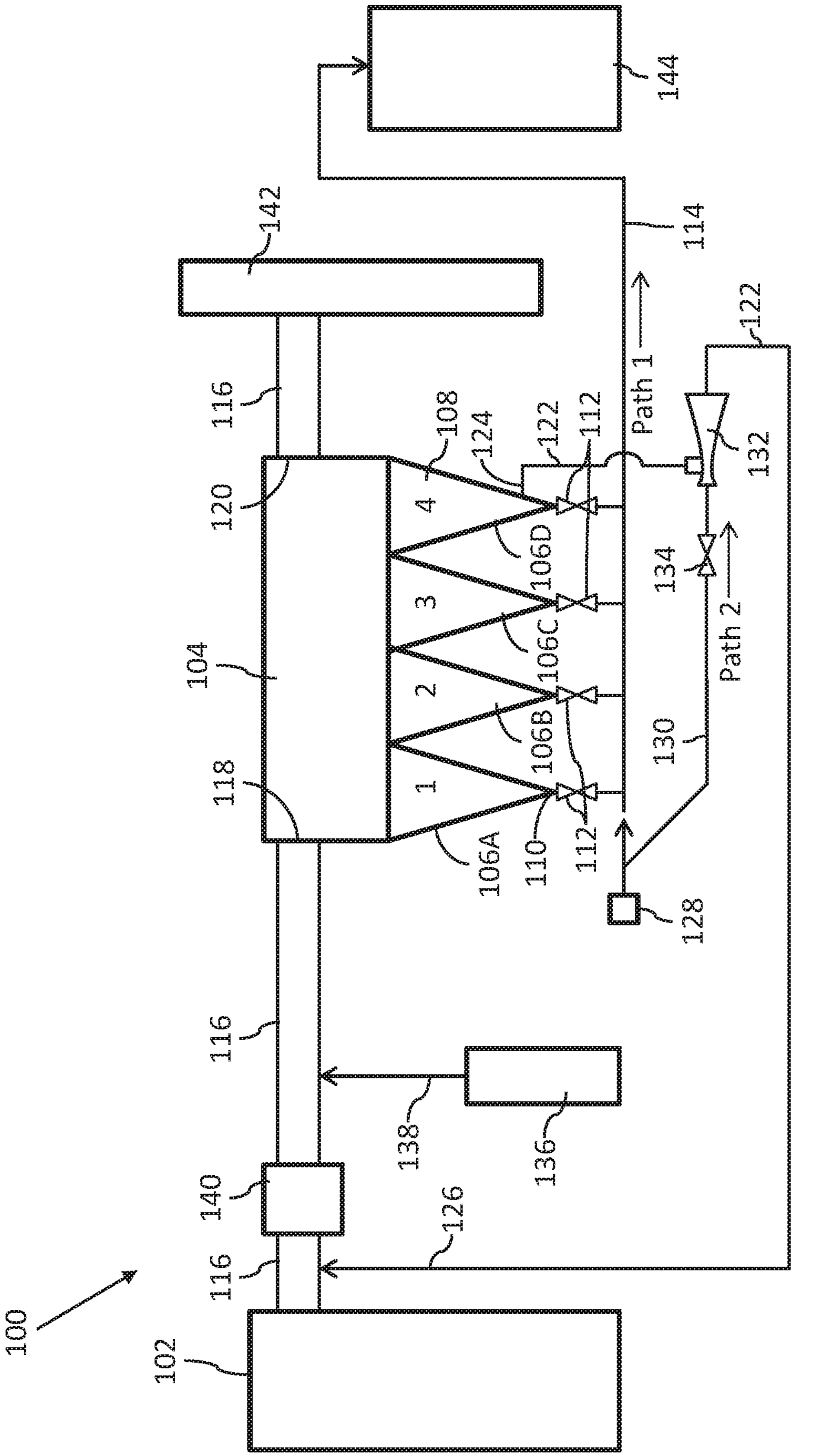
FIG. 1C illustrates a schematic of system 100 for the removal of particulate emissions from an EGU.

FIGS. 1A-1C illustrate a schematic of a system 100 for the removal of particulate emissions from an EGU.

System 100 may include a gas producer 102. Gas producer 102 may include a furnace of an EGU. The furnace of the EGU may generate flue gas as the result of combustion of a fuel, such as a fossil fuel, for creating steam in electric power generation. The flue gas may include various constituents, including ash and pollutants, which must be removed from the flue gas before the flue gas is allowed to enter the atmosphere. Common gas pollutants may include mercury (Hg) and sulfur trioxide ($SO_3$). Ash contained in the flue gas may be characterized as flyash.

The equipment of particulate control systems, such as system 100, may be used as part of a multi-pollutant control strategy in an EGU. Various sorbents may be injected upstream in some instances, or downstream in other instances, of the particulate control device (e.g., a primary particulate collector unit 104). The sorbents may react with and/or adsorb select gas phase pollutants while the sorbents and pollutants are in flight in the flowing flue gas. Alternatively, or additionally, the sorbents may react with and/or adsorb select gas phase pollutants while the sorbents or pollutants are substantially stationary, for example, trapped in a filter cake of a fabric filter. Common sorbents may include powered activated carbon ("PAC") for mercury capture, or lime, trona, or sodium bicarbonate for acid gas capture.

As noted above, system 100 may include a primary particulate collector unit 104. Flue gas may flow from gas producer 102 to collector unit 104 via a flue duct 116 fluidically connecting the gas producer 102 and collector unit 104. The term "duct" as used herein is understood to be an element configured to direct and constrain the flow of a fluid, including for example, flue gas, from one point to another. A duct may be a pipe or the like. Collector unit 104 may include at least one primary collection hopper field 106A, 106B, 106C, and 106D. Each field 106A, 106B, 106C, and 106D may include at least one primary collection hopper 108. Each field 106A, 106B, 106C, and 106D may include a plurality of primary collection hoppers 108. By way of example, each field 106A, 106B, 106C, and 106D may include eight to twelve primary collection hoppers 108.

Collector unit 104 may be a dry electrostatic precipitator ("ESP"). A dry ESP may electrically charge ash particles and/or sorbents contained in flue gas flowing through the dry ESP. The dry ESP may collect and remove the ash particles and/or sorbents, which may ultimately fall into primary collection hoppers 108 of any of fields 106A, 106B, 106C, and 106D.

Collector unit 104 may be a fabric filter baghouse. A fabric filter baghouse may include a series of fabric filter bags, which separate particulate matter from the flue gas. The particulate matter may include ash particles and/or sorbents contained in the flue gas flowing through the baghouse. The baghouse may collect and remove the ash particles and/or sorbents, which may fall into primary collection hoppers 108 of any of fields 106A, 106B, 106C, and 106D.

Flue gas may flow through collector unit 104 and encounter fields 106A, 106B, 106C, and 106D in the following order: 106A, 106B, 106C, and followed by 106D. Where collector unit 104 contains fewer than four, or more than four, fields it is understood that flue gas may encounter the fields beginning with field closest to a collector unit inlet 118 of collector unit 104, and ending with the field closest to a collector unit outlet 120. As illustrated in FIGS. 1A-1C and 2-5, the fields are numbered (by way of example, and without limitation, fields 1-4) to correspond with the order in which the flue gas may encounter the fields.

Collector unit inlet 118 may be oriented upstream of fields 106A, 106B, 106C, and 106D. Collector unit outlet 120 may be oriented downstream of fields 106A, 106B, 106C, and 106D.

The flue gas may contain particles having a variety of sizes. As noted, these particles may include flyash and sorbents. Where collector unit 104 is a dry ESP unit, coarser particles in the flue gas may be captured more readily in the first fields that the flue gas encounters, such as fields 1 and 2. Again where collector unit 104 is a dry ESP unit, finer particles in the flue gas may be captured less readily in the first fields that the flue gas encounters, such as fields 1 and 2, and may be captured more readily in later-encountered fields, such as fields 3 (106C) and 4 (106D). Often, the coarser particles found in flue gas may be made up primarily of ash particles with a low percentage of sorbent particles, whereas the finer particles found in flue gas may be made up with a higher percentage of sorbent particles. As a result, the sorbent particles in a four field dry ESP unit may be primarily captured in the third (106C) and fourth (106D) fields of the dry ESP unit.

To explain further, in a four field dry ESP system, the first field (106A) may capture about 80% to about 90% of the ash that enters collector unit 104. The second field (106B) may capture about 80% to about 90% of the ash that passes the first field (106A) of collector unit 104 and enters the second field (106B) of collector unit 104. The third field (106C) may capture about 80% to about 90% of the ash that passes the second field (106B) of collector unit 104 and enters the third field (106C) of collector unit 104. Finally, the fourth field (106D) may capture about 80% to about 90% of the ash that passes the third field (106C) of collector unit 104 and enters the fourth field (106D) of collector unit 104. It is noted that the various fields may capture less than about 80% or more than about 90% of the ash entering those fields.

Accordingly, the ash found in the third (106C) and fourth (106D) fields combined may have about 20% to about 30% sorbent content (such as PAC) as part of its constituents. It is noted that the ash found in the third (106C) and fourth (106D) fields may have less than about 20% and more than about 30% sorbent content as part of its constituents. The ash found in the third (106C) and fourth (106D) fields, with its higher surface area due to having a finer particle size, and a higher sorbent percentage (such as PAC), may be reinjected into the flue gas upstream of collector unit 104 and allowed to react with and/or adsorb additional select gas phase pollutants while the sorbents and pollutants are in flight in the flowing flue gas. Where a sorbent is PAC, for example, such reinjection may lead to about 20% to about 40% overall reduction in PAC utilization. It is understood that the ash of all fields may include at least some sorbent introduced into the flue gas upstream, and reinjection of the ash-sorbent mixture in system 100 is not necessarily limited to that mixture taken from fields 3 (106C) or 4 (106D). On the other hand, as the final field in the dry ESP, for example, the fourth field (106D), may contain the highest percentage of sorbent and lowest percentage of ash by weight of the mixture taken from a single field, system 100 may only reinject the ash-sorbent mixture found in field four (106D). Accordingly, the various embodiments herein illustrate that the ash-sorbent mixture from any field may be selectively reinjected into the flue gas.

To facilitate reinjection of the sorbent, each primary collection hopper 108 may include a primary collection hopper outlet 110. Each primary collection hopper outlet 110 may be fluidically connected to a particulate discharge duct 114. A valve 112 may be oriented between one or more primary collection hopper outlet 110 and particulate discharge duct 114. In practice, hoppers 108 of system 100 may fill with ash, sorbent, or a mixture of ash and sorbent, to a point that hoppers 108 must be emptied. Accordingly, valve 112 of first field 106A, for example, may be opened, allowing the material contained within one or more hoppers 108 of first field 106A to dump from the hoppers 108, and into particulate discharge duct 114. This same procedure may be applied to valve 112 of second field 106B, valve 112 of third field 106C, and valve 112 of fourth field 106D.

By way only of example, FIG. 1A illustrates an embodiment where the first field (106A), second field (106B), and third field (106C) are fluidically connected only to particulate discharge duct 114, while the fourth field (106D) may be connected to both particulate discharge duct 114 and a particulate recirculation duct 122.

Particulate recirculation duct 122 may connect at a first end 124 to at least one of primary collection hoppers 108 of any of fields 106A, 106B, 106C, and 106D. Particulate recirculation duct 122 may connect at a second end 126 to flue duct 116. Particulate recirculation duct 122 may connect at a second end 126 to flue duct 116 upstream of primary particulate collector unit 104.

System 100 may include a primary pressurization device 128 fluidically connected to particulate discharge duct 114.

Primary pressurization device 128 may be a pump, a compressor, or any other device capable of generating a pressure in a fluid capable of driving an ash-sorbent mixture through particulate discharge duct 114. The fluid may be a gas, such as air. Primary pressurization device 128 may generate any of a variety of pressures. For example, primary pressurization device 128 may be configured to generate a pressure of about 15 psig. Primary pressurization device 128 may also be configured to generate a pressure between about 10 psig and 18 psig.

Primary pressurization device 128 may be fluidically connected to particulate recirculation duct 122. Primary pressurization device 128 may be fluidically connected to particulate recirculation duct 122 via pressurization duct 130. Pressurization duct 130 may include a valve 134 configured to selectively permit a flow of a fluid through pressurization duct 130 or selectively stop the flow of a fluid through pressurization duct 130. Pressurization duct 130 and particulate recirculation duct 122 may be fluidically connected to an eductor 132. An eductor as used herein, such as eductor 132 for example, may include a suction inlet and a discharge, each fluidically connected to particulate recirculation duct 122. The eductor may include an inlet fluidically connected to primary pressurization device 128, for example through pressurization duct 130. The eductor may include an inlet nozzle, preceding the suction inlet, and a venturi diffuser following the suction inlet. In this manner, eductor 132 may, upon exposure to pressure created by primary pressurization device 128, following opening of valve 134, create a reduced pressure "suction" causing material from hopper 108 of fourth field 106D to travel through particulate recirculation duct 122, through eductor 132, and continue to travel through particulate recirculation duct 122 to particulate recirculation duct 122's second end 126, to be reintroduced into flue duct 116 and the flue gas traveling therein. Where an operator or system control desires to discontinue the transport of material from hopper 108 of fourth field 106D through particulate recirculation duct 122, the operator may close valve 134, discontinue pressurization of pressurization duct 130 by primary pressurization device 128, or both.

One determining factor in whether to transport material from hopper 108 of fourth field 106D through particulate recirculation duct 122 may be the quantity of material contained in hopper 108 of fourth field 106D. That is, once the at least one hopper 108 of fourth field 106D reaches a predetermined volume of material, system 100 may automatically, or via manual operation, cause material from hopper 108 of fourth field 106D to be transported through particulate recirculation duct 122 and back into the flue gas in flue duct 116.

FIGS. 1A-1C illustrate two flow paths indicated as path 1 and path 2. Path 1 is the flow of material from hopper 108 through particulate discharge duct 114 and into a storage silo 144. Transport of material (ash, sorbent, or a mixture thereof) to storage silo 144 may effectively remove that material from system 100, or immediately precede the removal of the material from system 100, where the removal is effected through emptying of storage silo 144 and transport of the material away for disposal. In one embodiment, a plurality of storage silos 144 are included in system 100 (or any of systems 200, 300, 400, and 500), with ash, sorbent, or a mixture thereof from fields in which material is not recirculated (e.g., first field 106A, second field 106B, and third field 106C) routed to a first storage silo 144, while an ash-sorbent mixture subject to recirculation (e.g., material from fourth field 106D) may be routed to a second storage silo 144. The ash-sorbent mixture captured in second storage silo 144 may include finer material, including finer fly ash, and may be subject to further recycling through use in other industries, such as the cement industry.

Path 2, on the other hand, causes the flow of material from hopper 108 of fourth field 106D through particulate recirculation duct 122 and back into flue duct 116 and flue gas upstream of collector unit 104. The material may accordingly pass back into collector unit 104, while the sorbent contained in the material may react with and/or adsorb select gas phase pollutants while the sorbents and pollutants are in flight in the flowing flue gas.

It should be understood that the sorbents, for example, PAC, may not be completely used in a single pass through flue duct 116 and collector unit 104. Rather, the sorbent, such as PAC, may be capable of reacting with or adsorbing additional gas phase pollutants following a single pass through system 100. The sorbent, such as PAC, may be capable of effectively reacting with or adsorbing additional gas phase pollutants in the flue gas through two, three, or even more cycles through flue duct 116 and collector unit 104. PAC, for example, may act as a sorbent by adsorbing mercury on the surface of the PAC particle. Thus, until the entire surface of a PAC particle is coated with adsorbed mercury (and thus has reached its saturation limit), that PAC particle may be capable of adsorbing additional mercury. For example, one study by Keping Yan et al. found that the capacity of PAC for mercury removal was between 1,400 μg of Hg/gm of PAC with $SO_3$ injection and 4,200 μg of Hg/gm of PAC without $SO_3$ injection. Modeling Mercury Capture with ESPs: Continuing Development and Validation, 11th International Conference on Electrostatic Precipitation, Hangzhou, 2008. The difference related to $SO_3$ injection is because $SO_3$ competes with mercury for active sites on the PAC. As such, PAC possesses a very high capacity for mercury removal under EGU operating conditions. Similar concepts may apply to other sorbents commonly injected into flue gas in an EGU.

System 100 may include a fresh sorbent silo 136, fluidically connected to flue duct 116 via a silo duct 138. Fresh sorbent, which refers to that sorbent that has not yet been circulated through flue duct 116 in the flue gas, or through collector unit 104, may be contained in fresh sorbent silo 136. Fresh sorbent, not yet exposed to gas phase pollutants, is capable of adsorbing gas phase pollutants. On the other hand, recirculated sorbent, having been exposed to gas phase pollutants and having adsorbed some quantity of gas phase pollutants already, may not adsorb additional gas phase pollutants (if completely saturated), or may adsorb gas phase pollutants at a lower rate or magnitude as fresh sorbent.

Fresh sorbent may be injected into the flue gas upon demand by system 100, as determined by an operator, or through an indication of pollutant monitoring systems that mercury levels measured at a stack 142 are higher than desired. Flue duct 116 may fluidically connect collector unit outlet 120 to stack 142. Stack 142 may be a stack for releasing acceptable flue gas (acceptable under government regulations, system protocols, or both) into the atmosphere. System 100 may include sensors at, near, or in, stack 142 that measure or sense any of a variety of properties of flue gas passing into the atmosphere. For example, where the sorbent is PAC, and where a sensor in system 100, for example a sensor at, near, or in, stack 142 indicates that mercury levels in the flue gas to be released into the atmosphere are reaching a predetermined threshold, additional fresh PAC from fresh sorbent silo 136 may be introduced into the flue gas in flue duct 116 upstream of collector unit 104. Alternatively, or additionally, less recirculated PAC may be reinjected into the flue gas duct 116 until mercury levels are decreased to a desired level. The combination of fresh sorbent and recirculated sorbent must achieve the desired adsorption of gas phase pollutants (acceptable under government regulations, system protocols, or both) from the flue gas prior to the flue gas being released into the atmosphere. Thus, the ratio of fresh sorbent to recirculated sorbent may be adjusted to maintain the effectiveness of the sorbent as a whole.

As illustrated in FIG. 1A, particulate recirculation duct 122 may be fluidically connected to flue duct 116 at a point downstream of fresh sorbent silo 136 and upstream of collector unit 104.

System 100 may include an air heater 140 fluidically connected to flue duct 116 to cool the flue gas. Air heater 140 may be oriented downstream of gas producer 102 and upstream of fresh sorbent silo 136. As illustrated in FIG. 1B, particulate recirculation duct 122 may be fluidically connected to flue duct 116 at a point upstream of fresh sorbent silo 136 and downstream of air heater 140. As illustrated in FIG. 1C, particulate recirculation duct 122 may be fluidically connected to flue duct 116 at a point upstream of air heater 140 and downstream of gas producer 102.

It is understood that any of systems 100, 200, 300, 400, and 500 described herein and illustrated in the drawings may be arranged such that recirculation duct 122 may be fluidically connected at any of the points along flue duct 116 illustrated in FIGS. 1A-1C.

The placement of recirculation duct 122 as far upstream as possible may be beneficial in that the residence time (time of exposure) of the sorbent reinjected into the flue gas may be maximized, which may increase the effect of the sorbent to react with or adsorb targeted gas phase pollutants. In some embodiments, particularly in the case of a dry ESP primary particulate collector unit 104, PAC residence time may be between about 3.0 s and about 15.0 s. In other embodiments, PAC residence time may be between about 4.0 s and about 5.0 s. In other embodiments, PAC residence time may be between about 12.0 s and about 15.0 s. In other embodiments, PAC residence time may be between about 15.0 s and about 20.0 s. In other embodiments, PAC residence time may be between about 18.0 s and about 23.0 s.

Air heater 140 may operate to cool the flue gas exiting gas producer 102. One limiting factor in the ability to reinject a sorbent via particulate recirculation duct 122 upstream of or downstream of but in close proximity to, air heater 140, is the combustion temperature of a sorbent to be reinjected. Where the sorbent is PAC, the allowed upper temperature limit of the flue gas at the reinjection site may be about 700 degrees Fahrenheit (371 degrees Celsius), about 750 degrees Fahrenheit (399 degrees Celsius), about 800 degrees Fahrenheit (427 degrees Celsius), or within a range bounded by two of these three temperatures. In light of this, certain types of air heaters (e.g., regenerative air heaters) may be more difficult to place downstream of the reinjection site than others (e.g., tubular air heaters). Additionally, in some states, sorbents such as PAC may self-ignite near temperatures between about 450 degrees Fahrenheit (232 degrees Celsius) and about 500 degrees Fahrenheit (260 degrees Celsius).

Figure 2:
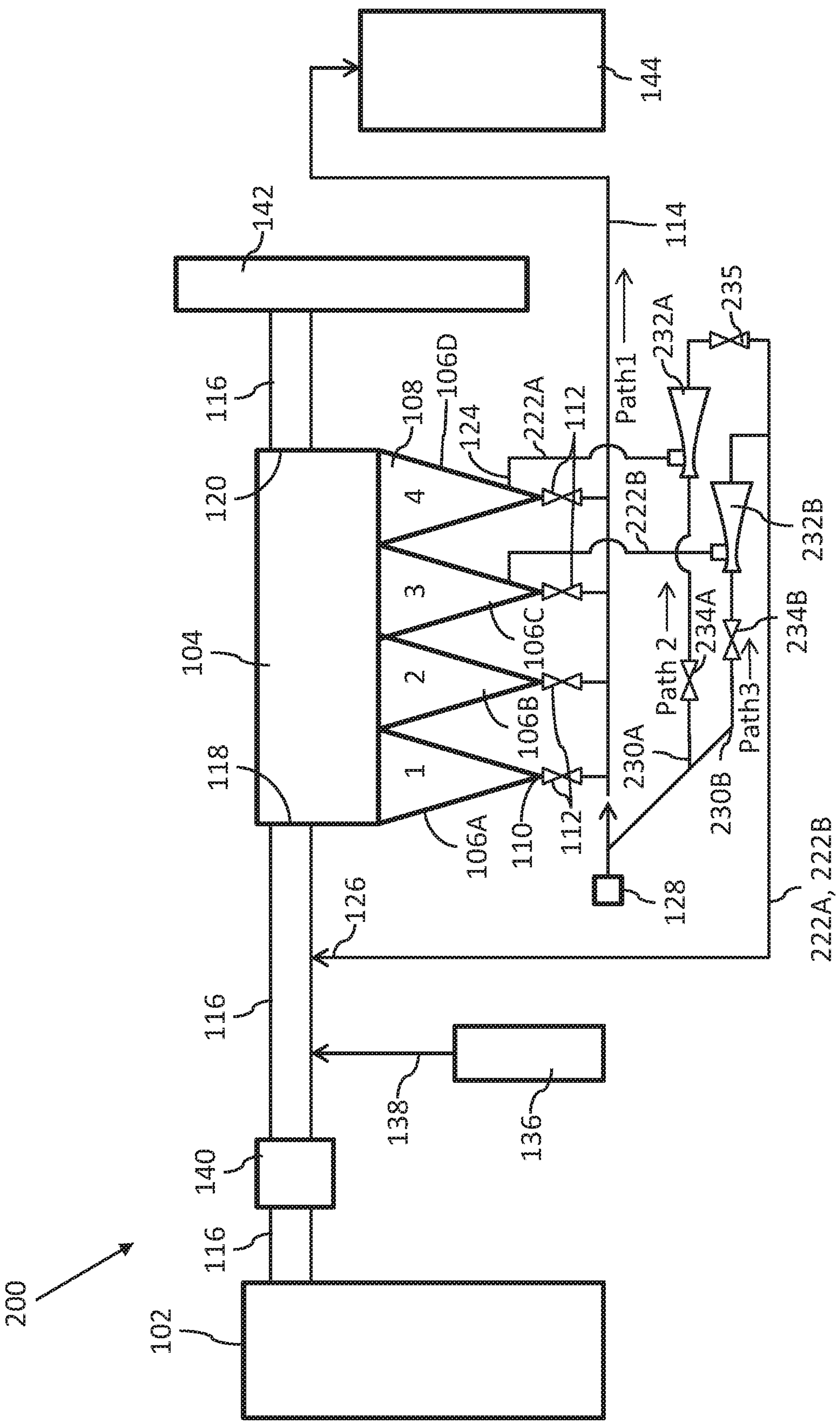
FIG. 2 illustrates a schematic of a system 200 for the removal of particulate emissions from an EGU.

FIG. 2 illustrates a schematic of a system 200 for the removal of particulate emissions from an EGU. System 200 includes many elements that are the same as those illustrated in FIGS. 1A-1C, and described above with respect to system 100. In the figures, like elements bear like reference numerals. As such, only those elements that are different from those described above with respect to system 100 have different reference numerals.

System 200 may include a first particulate recirculation duct 222A fluidically connected to field 106D. System 200 may include a second particulate recirculation duct 222B fluidically connected to third primary collection field 106C.

First particulate recirculation duct 222A may be fluidically connected to first eductor 232A. Second particulate recirculation duct 222B may be fluidically connected to second eductor 232B. Primary pressurization device 128 may be fluidically connected to particulate recirculation ducts 222A and 222B. Primary pressurization device 128 may be fluidically connected to first and second particulate recirculation ducts 222A and 222B via first and second pressurization ducts 230A and 230B, respectively. Pressurization ducts 230A and 230B may include first and second valves 234A and 234B, respectively. A valve 235 may be oriented between first and second particulate recirculation ducts 222A and 222B to isolate first and second particulate recirculation ducts 222A and 222B from one another. In this manner, in addition to path 1 and path 2 described above, a path 3 is created where primary pressurization device 128 may supply pressure through open valve 234B and into second eductor 232B. This pressure applied to second eductor 232B may create a reduced pressure "suction" causing material from hopper 108 of third field 106C to travel through particulate recirculation duct 222B, through eductor 232B, and travel into a combined particulate recirculation duct 222A, 222B to particulate recirculation duct 222A, 222B's second end 126, to be reintroduced into flue duct 116 and the flue gas traveling therein.

The opening of valves 234A and 235 while valve 234B is closed may permit a path 2 flow, while the opening of valve 234B while valves 234A and 235 are closed may permit a path 3 flow. The opening of valves 234A, 234B, and 235 simultaneously may permit a simultaneous path 2 flow and path 3 flow.

It is noted that it may be possible to allow simultaneous flow through at least two of paths 1, 2, and 3 (where applicable) of systems 100, 200, 300, 400, 500, and 600. For example, in system 200, one or both of hopper 108 associated with fourth field 106D (path 2) and hopper 108 associated with third field 106C (path 3) may have material removed simultaneously with the removal of material from one or both of hoppers 108 associated with first field 106A and second field 106B (path 1).

One determining factor in whether to transport material from hopper 108 of fourth field 106D through particulate recirculation duct 222A (path 2), or whether to transport material from hopper 108 of third field 106C through particulate recirculation duct 222B (path 3), may be the quantity of material contained in hopper 108 of fourth field 106D and the quantity of material contained in hopper 108 of third field 106C. Similarly, one determining factor whether to transport material from any of hoppers 108 through particulate discharge duct 114 may be the quantity of material contained in any of hoppers 108. Hoppers 108 may need to be emptied on a regular schedule to avoid overfilling of any given hopper 108.

Figure 3:
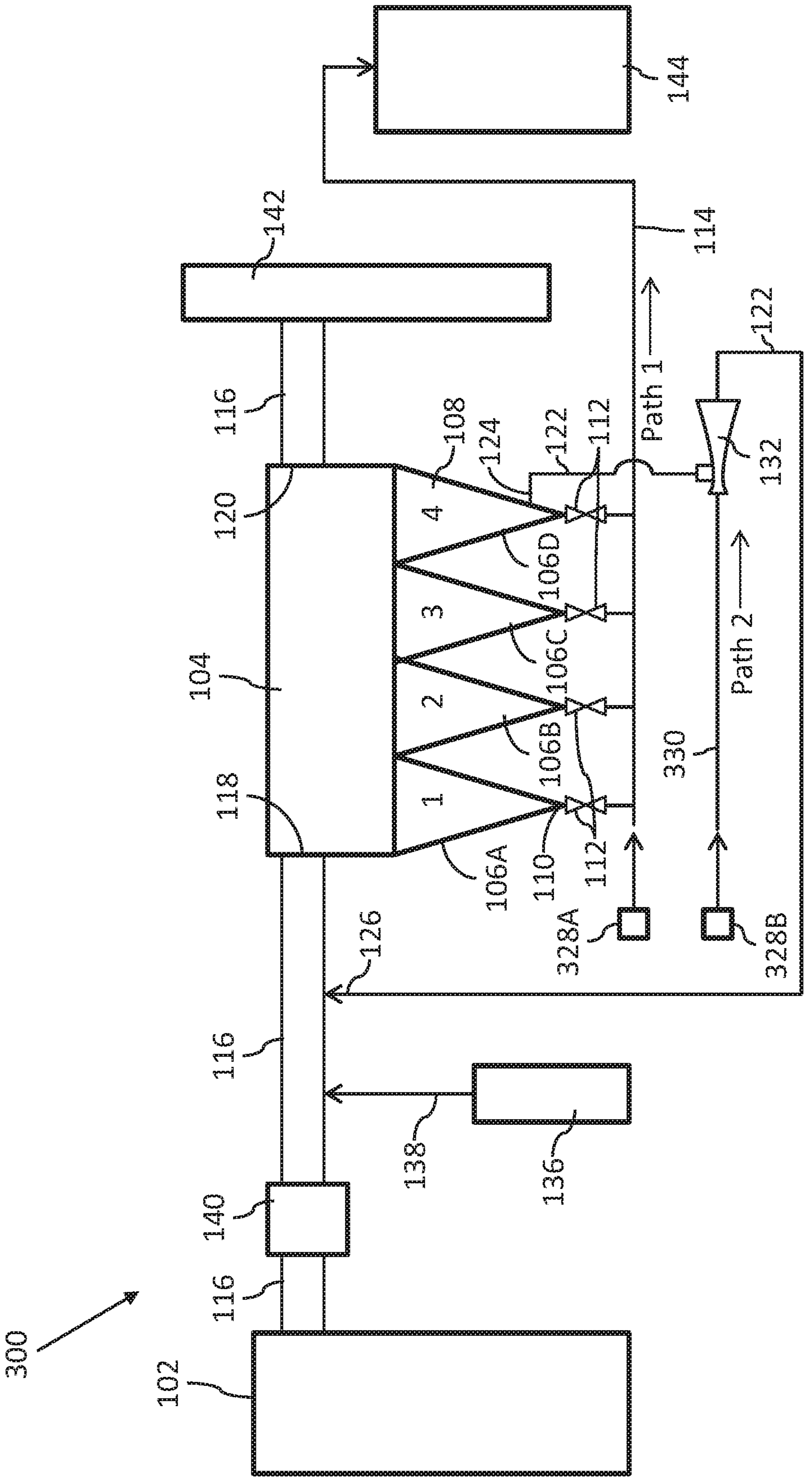
FIG. 3 illustrates a schematic of a system 300 for the removal of particulate emissions from an EGU.

FIG. 3 illustrates a schematic of a system 300 for the removal of particulate emissions from an EGU. System 300 includes many elements that are the same as those illustrated in FIGS. 1A-1C, and described above with respect to system 100. In the figures, like elements bear like reference numerals. As such, only those elements that are different from those described above with respect to system 100 have different reference numerals.

System 300 may include a primary pressurization device 328A configured to provide pressurization of fluid that is fluidically connected to each collection hopper 108 and primary collection hopper outlet 110 in each of at least one primary collection field 106A, 106B, 106C, and 106D. Each hopper 108 (of any of systems 100, 200, 300, 400, and 500) may include an eductor (not shown) associated with that hopper 108, such that providing pressurized fluid by primary pressurization device 328A and opening valve 112 for a specific hopper 108, causes a suction of material from that hopper 108 into particulate discharge duct 114 (path 1). System 300 may allow for only one hopper 108 to be emptied at a time, or more than one hopper 108 to be emptied simultaneously. System 300 may allow for each hopper 108 of a single primary collection field 106A, 106B, 106C, and 106D to be emptied simultaneously. In this orientation, primary pressurization device 328A may be configured to allow selective path 1 flow.

System 300 may include a secondary pressurization device 328B configured to provide pressurization of a fluid in pressurization duct 330. In this orientation, secondary pressurization device 328B may be configured to allow selective path 2 flow. Secondary pressurization device 328B may be a pump, a compressor, or any other device capable of generating a pressure in a fluid capable of driving an ash-sorbent mixture through particulate recirculation duct 122.

Figure 4:
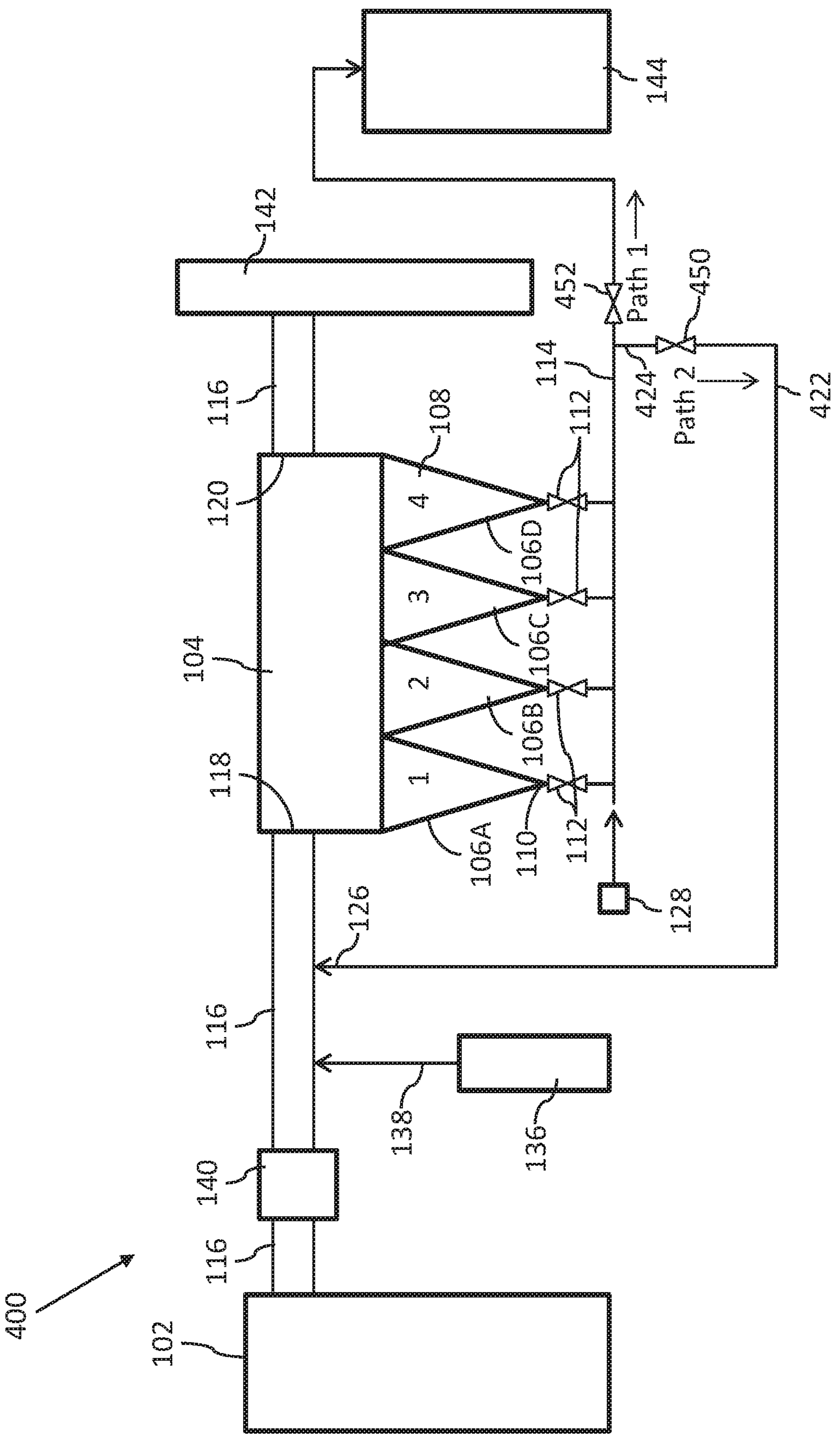
FIG. 4 illustrates a schematic of a system 400 for the removal of particulate emissions from an EGU.

FIG. 4 illustrates a schematic of a system 400 for the removal of particulate emissions from an EGU. System 400 includes many elements that are the same as those illustrated in FIGS. 1A-1C, and described above with respect to system 100. In the figures, like elements bear like reference numerals. As such, only those elements that are different from those described above with respect to system 100 have different reference numerals.

System 400 may include a particulate recirculation duct 422 having a first end 424 fluidically connected to particulate discharge duct 114. When system 400 empties any of hoppers 108 into particulate discharge duct 114 for transport to storage silo 144 (path 1), any of valves 112 may be opened, a valve 452 is opened, and a valve 450 is closed. When system 400 empties any of hoppers 108 into particulate recirculation duct 422 for reinjection into flue duct 116 (path 2), any of valves 112 may be opened, valve 450 is opened, and valve 452 is closed.

Figure 5:
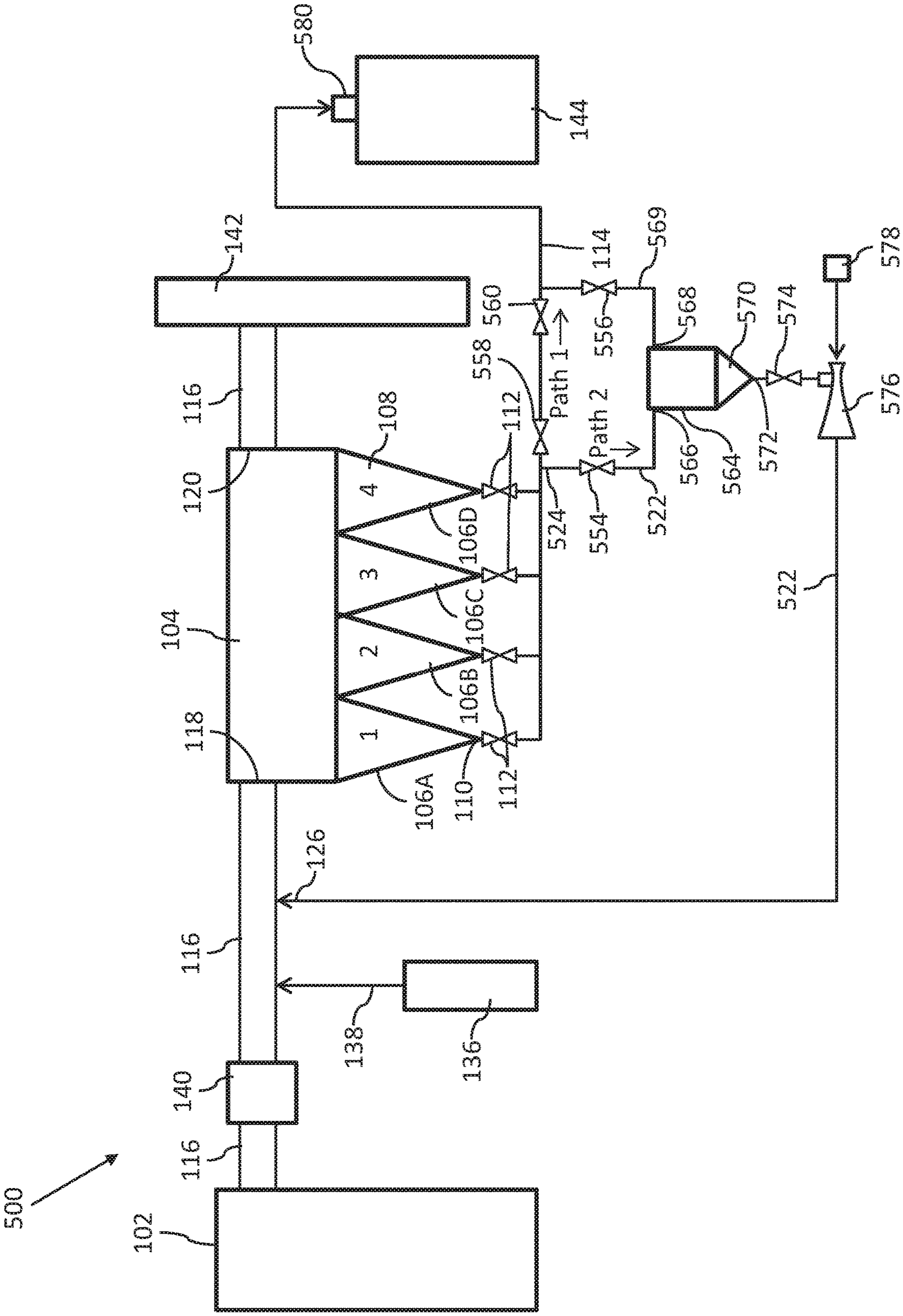
FIG. 5 illustrates a schematic of a system 500 for the removal of particulate emissions from an EGU.

FIG. 5 illustrates a schematic of a system 500 for the removal of particulate emissions from an EGU. System 500 includes many elements that are the same as those illustrated in FIGS. 1A-1C, and described above with respect to system 100. In the figures, like elements bear like reference numerals. As such, only those elements that are different from those described above with respect to system 100 have different reference numerals.

System 500 may include a secondary particulate collector unit 564. Secondary particulate collector unit 564 may include a particulate recirculation duct inlet 566, a fluid duct outlet 568 fluidically connected to particulate discharge duct 114 by a fluid duct 569, and at least one secondary collection hopper 570. A valve 556 may be oriented in fluid duct 569 to permit or stop flow of a fluid through fluid duct 569.

At least one secondary collection hopper 570 may include a secondary collection hopper outlet 572. Secondary collection hopper outlet 572 may be fluidically connected to a particulate recirculation duct 522 at a point downstream of secondary collection hopper 570. Particulate recirculation duct inlet 566 may be fluidically connected to particulate recirculation duct 522 at a point upstream of secondary collection hopper 570.

Particulate recirculation duct 522 may fluidically connect at a first end 524 to particulate discharge duct 114, with a valve 554 oriented within particulate recirculation duct 522 at a point downstream of first end 524 and upstream of secondary particulate collector unit 564. Particulate recirculation duct 522 may include a valve 574 oriented downstream of secondary collection hopper 570.

An eductor 576 may be oriented downstream of valve 574. A secondary pressurization device 578 may be fluidically connected to eductor 576. Particulate recirculation duct 522 may be connected to eductor 576 at a point downstream of at least one secondary collection hopper 570, and at a point downstream of secondary pressurization device 578. Secondary pressurization device 578 may be fluidically connected to particulate recirculation duct 522 at a point downstream of at least one secondary collection hopper 570. Upon pressurization of a fluid fluidically connected to eductor 576 and opening of valve 574, material (ash, sorbent, or both) contained in secondary collection hopper 570 may be transported through particulate recirculation duct 522 and back into the flue gas in flue duct 116. In one embodiment, eductor 576 is replaced with a rotary valve (not shown).

System 500 may include a vacuum producer 580 fluidically connected to particulate discharge duct 114 at a point downstream of primary particulate collector unit 104. Vacuum producer 580 may be oriented in fluid connection with storage silo 144. Vacuum producer 580 may be oriented at a top of storage silo 144. Vacuum producer 580 may create a reduced pressure "suction" in at least one of particulate discharge duct 114, fluid duct 569, and particulate recirculation duct 522 at least at a point upstream of secondary particulate collector unit 564, which may be near first end 524 of particulate recirculation duct 522.

Particulate discharge duct 114 may include at least one valve, such as valve 558 and/or valve 560. Valves 558 and/or 560 may be opened to permit a path 1 flow of material from hoppers 108 to storage silo 144. Vacuum producer 580 may create a reduced pressure "suction" in particulate discharge duct 114, which may allow material to be transported from any of hoppers 108 to storage silo 144.

To effect a path 2 flow, valves 558 and 560 may be closed, while valves 554 and 556 are opened. Vacuum producer 580 may create a reduced pressure "suction" in particulate discharge duct 114, particulate recirculation duct 522, and fluid duct 569, which may allow material to be transported from any of hoppers 108 to secondary particulate collector unit 564.

When at least one secondary collection hopper 570 contains a predetermined quantity of material, valve 574 may be opened, and secondary pressurization device 578 may be activated to cause eductor 576 to create a reduced pressure "suction" to transport material from secondary collection hopper 570 to second end 126 of particulate recirculation duct 522 and back into flue duct 116.

System 500 may allow for continued operation of system 500 even in the event of a failure of part or all of primary particulate collector unit 104. That is, secondary particulate collector unit 564 may be activated to temporarily replace the operation of primary particulate collector unit 104 until primary particulate collector unit 104 is back online.

Figure 6A:
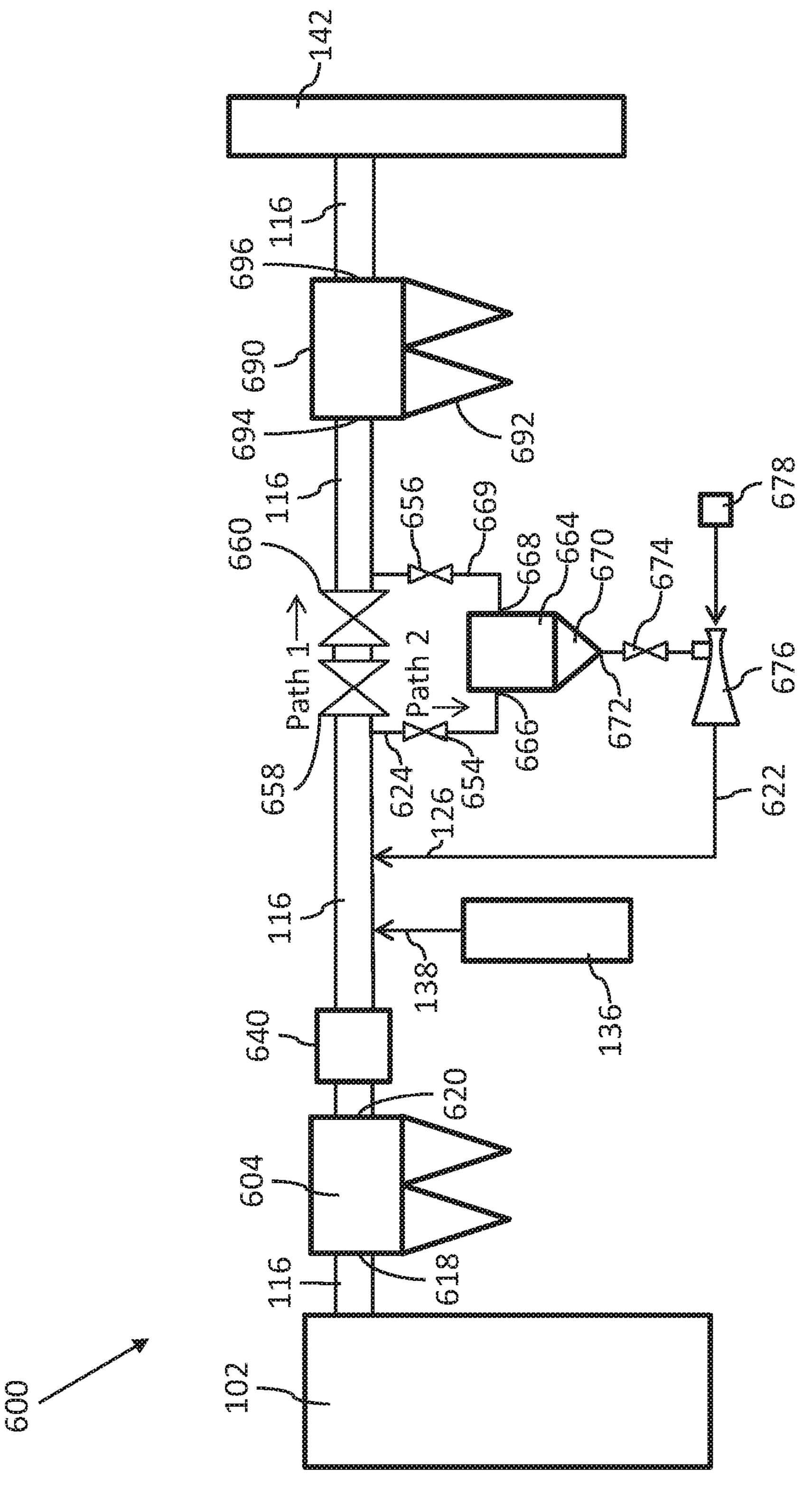
FIG. 6A illustrates a schematic of a system 600 for the removal of particulate emissions from an EGU.
Figure 6B:
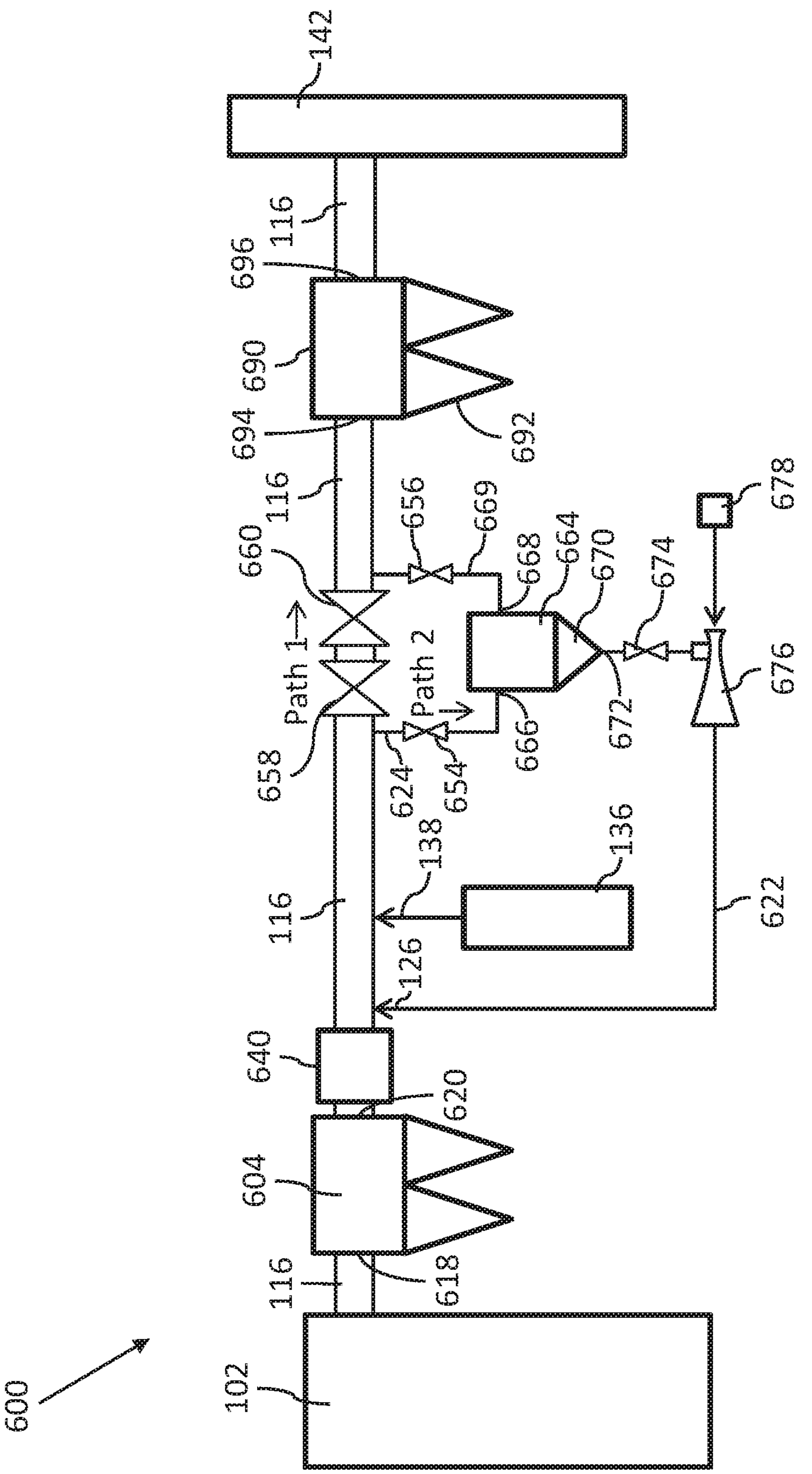
FIG. 6B illustrates a schematic of system 600 for the removal of particulate emissions from an EGU.

FIGS. 6A and 6B illustrate a schematic of a system 600 for the removal of particulate emissions from an EGU.

System 600 includes elements that are the same as those illustrated in FIGS. 1A-1C, and described above with respect to system 100. In the figures, like elements bear like reference numerals. As such, only those elements that are different from those described above with respect to system 100 have different reference numerals.

System 600 may include a primary particulate collector 604. Primary particulate collector 604 may be a dry ESP. Primary particulate collector 604 may include a flue duct inlet 618 and a flue duct outlet 620. Flue duct 116 fluidically connects gas producer 102 to primary particulate collector 604 at flue duct inlet 618.

System 600 may include a fabric filter baghouse 690. Fabric filter baghouse 690 may include a flue duct inlet 694 and a flue duct outlet 696. Flue duct inlet 694 may be downstream of a secondary particulate collector fluid duct outlet 668. Baghouse 690 may include at least one collection hopper 692. Where the sorbent is PAC, the injected PAC may remove mercury both inflight and across the filter cake of fabric filter baghouse 690.

System 600 may include an air heater 640.

System 600 may include a particulate recirculation duct 622 fluidically connected at a first end 624 to flue duct 116 downstream of primary particulate collector (e.g., dry ESP) 604. Particulate recirculation duct 622 may be fluidically connected to a secondary particulate collector unit 664.

Secondary particulate collector unit 664 may include a particulate recirculation duct inlet 666 fluidically connected to particulate recirculation duct 622. Secondary particulate collector unit 664 may include a fluid duct outlet 668 fluidically connected to flue duct 116 by a fluid duct 669. Secondary particulate collector unit 664 may include at least one secondary collection hopper 670. Secondary collection hopper 670 may include a secondary collection hopper outlet 672. Secondary collection hopper outlet 672 may be fluidically connected to particulate recirculation duct 622 at a point downstream of at least one secondary collection hopper 670. Particulate recirculation duct inlet 666 may be fluidically connected to particulate recirculation duct 622 at a point upstream of at least one secondary collection hopper 670.

Particulate recirculation duct 622 may be connected at second end 126 to flue duct 116 at a point downstream of primary particulate collector (e.g., dry ESP) 604 and upstream of particulate recirculation duct 622's first end 624 so that a flow of a fluid through particulate recirculation duct 622 is opposite the flow of a fluid through flue duct 116.

System 600 may include fresh sorbent silo 136 fluidically connected to flue duct 116 via a silo duct 138. Fresh sorbent silo 136 may be fluidically connected to flue duct 116 at a point downstream of primary particulate collector (e.g., dry ESP) 604. Fresh sorbent silo 136 may be fluidically connected to flue duct 116 at a point upstream of secondary particulate collector unit 664.

Particulate recirculation duct 622 may be connected at second end 126 to flue duct 116 at a point downstream of fresh sorbent silo 136. Particulate recirculation duct 622 may be connected at second end 126 to flue duct 116 at a point upstream of fresh sorbent silo 136.

System 600 may include a valve 658 fluidically connecting flue duct 116 and particulate recirculation duct 622. System 600 may include a valve 660 fluidically connecting flue duct 116 and fluid duct 669.

System 600 may include a valve 654 and a valve 656.

To operate system 600 without reinjecting sorbent in flue duct 116 via particulate recirculation duct 622, valves 654 and 656 are closed, and valves 658 and 660 are opened. This would cause the material to flow in path 1, with fresh sorbent injected by fresh sorbent silo 136, and a sorbent and/or ash mixture collected by fabric filter baghouse 690.

To operate system 600 to reinject sorbent in flue duct 116 via particulate recirculation duct 622, valves 654 and 656 are opened, and valves 658 and 660 are at least partially closed. This would cause at least some of the material to flow in path 2. Partial closure of valves 658 and 660 may create a slipstream resulting in flow in path 2. A sorbent and/or ash mixture from flue duct 116 would enter particulate recirculation duct 622 at first end 624, and enter secondary particulate collector unit 664. Secondary particulate collector unit 664 would collect the sorbent and/or ash mixture and deposit the mixture in secondary collection hopper 670. Secondary collection hopper outlet 672 may be fluidically connected to particulate recirculation duct 622, which may include a valve 674. An eductor 676 may be oriented downstream of valve 674. A pressurization device 678 may be fluidically connected to eductor 676. Particulate recirculation duct 622 may be connected to eductor 676 at a point downstream of at least one secondary collection hopper 670, and at a point downstream of secondary pressurization device 678. Pressurization device 678 may be fluidically connected to particulate recirculation duct 622 at a point downstream of at least one secondary collection hopper 670. Upon pressurization of a fluid fluidically connected to eductor 676 and opening of valve 674, material (ash, sorbent, or both) contained in secondary collection hopper 670 may be transported through particulate recirculation duct 622 and back into the flue gas in flue duct 116. Pressurization device 678 may be a pump, a compressor, or any other device capable of generating a pressure in a fluid capable of driving an ash-sorbent mixture through particulate recirculation duct 622.

As illustrated in FIG. 6A, particulate recirculation duct 622 may reinject sorbent and/or ash into flue duct 116 at a point downstream of fresh sorbent silo 136. As illustrated in FIG. 6B, particulate recirculation duct 622 may reinject sorbent and/or ash into flue duct 116 at a point upstream of fresh sorbent silo 136, and downstream of air heater 640. In another embodiment that is not illustrated, particulate recirculation duct 622 may reinject sorbent and/or ash into flue duct 116 at a point upstream of air heater 640 and downstream of primary particulate collector (e.g., dry ESP) 604.

In systems including a secondary particulate collector unit, the secondary particulate collector unit may facilitate the addition of different kinds of sorbents, such as PAC, to effect desired flue gas properties. For example, these different kinds of sorbents may be placed inside the secondary particulate collector unit in a fresh form, rather than a recycled form. In this manner, these products may be introduced to the system without requiring a shut down or other pause.

As a sorbent, such as PAC, is recirculated through any of the systems described above, the sorbent may adsorb particles that increase the diameter of the original sorbent material. Additionally, the sorbent may adsorb particles that make the sorbent more likely to bind with other particles and/or agglomerate or clump. For example, PAC has a high oxidation rate, which results in the release of heat, after which PAC particles may combust and fuse together. Keeping a sorbent such as PAC within the system longer, for the purpose of reinjection and recycling, could lead to fusing causing clumps. Agglomerated or clumped material may have the potential to create blockages within the systems that can cause shutdowns, or simply build up on undesirable surfaces that require maintenance to clean. As such, it may be beneficial or necessary to include at least one element within the particulate recirculation duct, the particulate discharge duct, the primary particulate collector unit, the secondary particulate collector unit, or at any other point within the recirculation system, that is configured to break up any agglomerated or clumped sorbent particles. For example, the element may include baffles, screens, fins, or the like within the flow space of the recirculation system, with which any agglomerated or clumped sorbent materials would contact during recirculation, thereby breaking up those agglomerated or clumped materials.

Additionally, keeping sorbent in the systems for a longer period of time may result in agglomerating or clumping of the sorbent in the hoppers. Air cannons, hopper vibrators, and the like may be employed to break up this agglomerated or clumped material. However, it may be necessary to ensure a more thorough removal of reused sorbent material from any hoppers.

In any of the systems described herein, it may be necessary to continue introducing fresh sorbent, such as PAC, at a constant rate. In standard systems, where sorbent is not reinjected, sorbents are fed into the system at a specific rate based upon a variety of factors, including the flue gas chemical makeup and physical properties, the type of particulate collector used, and the like. However, in a system where sorbent is reinjected, the introduction of fresh sorbent may be reduced to a minimum of about 70% of its standard system injection rate. In this manner, it may be possible to reduce sorbent usage up to about 30% (or even more).

Example 1

As an example of a standard, non-recirculating system, a 500 MW EGU with a gas flow rate of about 1.9 Macfm may use about 1.5 lb./Macfm of PAC to achieve 90% mercury removal. This rate may result in about 170 lb./hr. of PAC used in the system. At the current cost of PAC, this rate may result in about $145/hr. or $1,000,000 USD per year with a 60% capacity factor. A 30% reduction in PAC usage would save about $300,000 USD per year in PAC costs.

Due to the toxic and hazardous nature of many targeted pollutants in EGUs, including for example, mercury, disposal of saturated or otherwise spent sorbent, such as PAC, is significantly more expensive than disposal of similar non-toxic and non-hazardous items. Typically, the disposal fees for these toxic and hazardous materials are based upon the weight or volume of the material, with no regard to the concentration of toxic or hazardous elements (e.g., mercury) contained in the material. As such, with up to a 30% reduction in PAC as a result of recirculation of PAC material through any of the systems described herein, the weight and volume of the toxic and hazardous materials is less than it would be without recirculation of the PAC. This reduction in the weight and volume of the toxic and hazardous materials will result in reduced disposal fees for saturated or spent PAC. The disposal fees for saturated or spent PAC may be reduced by approximately the same amount as the overall reduction of PAC used (e.g., up to about 30% reduction in fees).

Additionally, it is contemplated that recirculated PAC and fly ash may be captured separately and routed to a separate storage silo, operating similarly to storage silo 144. This finer fly ash and PAC mixture may be recycled through utilization in industries, such as the cement industry.

Example 2

Table 1 below illustrates actual test results obtained via the recirculation of a sorbent material (BPAC) in an EGU. To conduct the test, ash samples from an EGU were collected. The EGU uses brominated PAC (BPAC) for mercury control and does not recirculate its sorbent materials. As such, the ash samples contained BPAC that had only been through one cycle of usage. The EGU utilizes a dry ESP primary particulate collector unit having five fields. The ash sample referenced above was taken from the third field. The quantity of BPAC in the sample relative to the total was about 50 lb., or about 3% of the total. The ash sample was reinjected into the flue gas of a different EGU. As indicated below, in some tests the flue gas was spiked with mercury to obtain repeatable data. All tests were conducted for a 1-hour period.

TABLE 1

| Test ID | Average 1-hour total mercury at ESP outlet in μg/Nm3 | Average 1-hour oxidized mercury at ESP outlet in μg/Nm3 | Average 1-hour elemental mercury at ESP outlet in μg/Nm3 | % Removal and Observation |
|---|---|---|---|---|
| Series 1 Baseline Powder River Basin Coal | 7.0 | 1.4 | 5.6 | N/A |
| Series 1 ESP ash from third field | 5.1 | 0.5 | 4.6 | 27% The reduction in both oxidized and elemental mercury shows that the BPAC in the ash sample was underutilized. |
| Series 2 Baseline with Hg spike | 6.6 | 1.6 | 5.0 | N/A |
| Series 2 Repeat test ESP ash from third field | 5.1 | 0.5 | 4.6 | 23% The reduction in both oxidized and elemental mercury shows that the BPAC in the ash sample was underutilized. |

In any of the systems described herein, logic controls may need to be developed in order to control a volume flow rate between fresh sorbent, such as PAC, and recirculated sorbent. Where the sorbent is PAC and the objective is mercury removal, the logic control may monitor the mercury content at the stack, or simply within the flue duct downstream of the particulate collector unit, and ensure that the mercury content does not exceed a predetermined threshold value. Where the mercury content increases to a point that remedial action is necessary, the system may increase the injection rate of fresh sorbent from the fresh sorbent silo. Additionally, or alternatively, the system may purge recycled sorbent which may be saturated and thus past its ability to effectively remove mercury from the flue gas. Purging may be as simple as discontinuing collection in recirculation hoppers (e.g., secondary collection hoppers 570 and 670), dumping material contained in recirculation hoppers (e.g., secondary collection hoppers 570 and 670), or simply halting the reinjection of recycled material into the flue duct and raising the injection rate of fresh sorbent to 100% of its standard system injection rate.

The presence of a greater quantity of sorbent in the system, some of which may be saturated and no longer adsorbing or otherwise effective, may cause the pressure within the system to increase. As such, in addition to, or as an alternative to, monitoring mercury levels, the logic control may monitor pressure increases within the system as an indicator that the system includes too great a quantity of recycled sorbent and sorbent material should be purged.

Where sorbent agglomerates or clumps, the logic control may identify such occurrences and initiate a purging of recirculated sorbent to eliminate the potential problems discussed herein with respect to such material.

It may be possible that the saturation of certain sorbents, such as PAC, may cause an increase in diameter of the sorbent. Furthermore, where sorbent begins agglomerating or clumping, the diameter of the agglomerated or clumped sorbent may increase. As a result, the saturated and spent sorbent material may become large enough to be readily caught in the first or second field of the collection hopper fields, which fields may not be part of the recirculation system. In this manner, saturated or spent sorbent may automatically remove itself from the system without a purge operation.

A product may be added to the recycled sorbent to cause it to agglomerate, clump, or otherwise increase in diameter at a certain rate. As a result, the recycled sorbent may grow to a particle size that causes it to become large enough to be readily caught in the first or second field of the collection hopper fields, which fields may not be part of the recirculation system. In this manner, saturated or spent sorbent may automatically remove itself from the system without a purge operation.

In systems including a secondary particulate collector unit, the logic controller may be programmed to add fresh sorbent as necessary to keep targeted pollutant levels (e.g., mercury) below a specific amount. Where the system begins adding fresh sorbent at a rate that exceeds a predetermined threshold, the system may recognize that the recycled sorbent is saturated or spent, and may initiate a purge operation from the secondary collection hopper to eliminate saturated or spent sorbent.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A system for the removal of particulate emissions from an electric generating unit, comprising:

a gas producer producing a flue gas;

a primary particulate collector unit including:

a plurality of primary collection hopper fields, wherein the flue gas flows through each of the plurality of primary collection hopper fields in an order, with the last being the final primary collection hopper field, each primary collection hopper field including at least one primary collection hopper, wherein each primary collection hopper includes a primary collection hopper outlet, and wherein each primary collection hopper outlet is fluidically connected to a particulate discharge duct;

a flue duct inlet oriented upstream of the at least one primary collection hopper field; and a flue duct outlet oriented downstream of the at least one primary collection hopper field;

wherein the gas producer is fluidically connected to the primary particulate collector unit by a flue duct; and a particulate recirculation duct fluidically connected at a first end to only the final primary collection hopper, and fluidically connected at a second end to the flue duct upstream of the primary particulate collector unit.

2. The system of claim 1, further comprising a primary pressurization device fluidically connected to the particulate recirculation duct.

3. The system of claim 2, further comprising an eductor fluidically connected to the particulate recirculation duct, the eductor upon exposure to a pressure created by the primary pressurization device creates a reduced pressure causing material from the final primary collection hopper to travel through the particulate recirculation duct.

4. The system of claim 1, further comprising a secondary particulate collector unit including:

a particulate recirculation duct inlet;

a fluid duct outlet fluidically connected to the particulate discharge duct by a fluid duct; and at least one secondary collection hopper, wherein the at least one secondary collection hopper includes a secondary collection hopper outlet, and wherein the secondary collection hopper outlet is fluidically connected to the particulate recirculation duct downstream of the at least one secondary collection hopper; and wherein the particulate recirculation duct inlet is fluidically connected to the particulate recirculation duct upstream of the at least one secondary collection hopper.

5. The system of claim 4, further comprising a pressurization device fluidically connected to the particulate recirculation duct downstream of the at least one secondary collection hopper.

6. The system of claim 5, further comprising an eductor fluidically connected to the particulate recirculation duct downstream of the at least one secondary collection hopper, and downstream of the pressurization device, the eductor upon exposure to a pressure created by the pressurization device causes material from the secondary collection hopper to travel through the particulate recirculation duct.

7. The system of claim 4, further comprising a vacuum producer fluidically connected to the particulate discharge duct downstream of the primary particulate collector unit.

8. A system for the removal of particulate emissions from an electric generating unit, comprising:

a gas producer producing a flue gas;

a primary particulate collector, the primary particulate collector comprising a dry electrostatic precipitator,
wherein the dry electrostatic precipitator includes a flue duct inlet and a flue duct outlet;

a flue duct fluidically connecting the gas producer and the dry electrostatic precipitator at the dry electrostatic precipitator flue duct inlet;

a particulate recirculation duct fluidically connected at a first end to the flue duct downstream of the dry electrostatic precipitator, the particulate recirculation duct connected to a secondary particulate collector unit,
wherein the secondary particulate collector unit includes:
a particulate recirculation duct inlet fluidically connected to the particulate recirculation duct;
a fluid duct outlet fluidically connected to the flue duct by a fluid duct, wherein all flue gas entering the secondary particulate collector unit exits the secondary particulate collector unit via the fluid duct outlet and the fluid duct to return to the flue duct and exit the system via a stack; and
at least one collection hopper,
wherein the at least one collection hopper includes a collection hopper outlet,
wherein the collection hopper outlet is fluidically connected to the particulate recirculation duct downstream of the at least one collection hopper, and
wherein the particulate recirculation duct inlet is fluidically connected to the particulate recirculation duct upstream of the at least one collection hopper;

a pressurization device fluidically connected to the particulate recirculation duct,
wherein the pressurization device pressurizes air within the particulate recirculation duct; and wherein the particulate recirculation duct is connected at a second end to the flue duct downstream of the dry electrostatic precipitator, and upstream of its first end, so that a flow of the air through the particulate recirculation duct is opposite the flow of the flue gas through the flue duct.

9. The system of claim 8, further comprising a fresh sorbent silo fluidically connected to the flue duct downstream of the dry electrostatic precipitator, and upstream of the secondary particulate collector unit, wherein the particulate recirculation duct is fluidically connected at its second end to the flue duct downstream of the fresh sorbent silo.

10. The system of claim 8, further comprising a fresh sorbent silo fluidically connected to the flue duct downstream of the dry electrostatic precipitator, and upstream of the secondary particulate collector unit, wherein the particulate recirculation duct is fluidically connected at its second end to the flue duct upstream of the fresh sorbent silo.

11. The system of claim 8, further comprising a fabric filter baghouse.

12. The system of claim 11, wherein the fabric filter baghouse includes a flue duct inlet and a flue duct outlet, wherein the fabric filter baghouse flue duct inlet is downstream of the secondary particulate collector fluid duct outlet.

13. The system of claim 8, further comprising a valve fluidically connecting the flue duct and the particulate recirculation duct.

14. The system of claim 8, further comprising a valve fluidically connecting the flue duct and the fluid duct.

15. The system of claim 8, further comprising an eductor fluidically connected to the particulate recirculation duct, the eductor upon exposure to the pressurized air created by the pressurization device creates a reduced pressure causing the material from the collection hopper to travel through the particulate recirculation duct.

* * * * *